US008584414B1

(12) United States Patent
Hines (10) Patent No.: US 8,584,414 B1
(45) Date of Patent: Nov. 19, 2013

(54) REVERSE-PERSPECTIVE ARCHITECTURE (76) Inventor: Stephen P. Hines, Glendale, CA (US)

( * ) Notice: Subject to any disclaimer, the term of this patent is extended or adjusted under 35 U.S.C. 154(b) by 0 days.

(21) Appl. No.: 13/303,653

(22) Filed: Nov. 23, 2011

Related U.S. Application Data (63) Continuation-in-part of application No. 13/231,947, filed on Sep. 13, 2011, now abandoned, which is a continuation-in-part of application No. 13/231,921, filed on Sep. 13, 2011, now Pat. No. 8,336,238.

(60) Provisional application No. 61/382,424, filed on Sep. 13, 2010.

(51) Int. Cl.
A63G 31/00 (2006.01)
E04C 1/00 (2006.01)

(52) U.S. Cl.
USPC ............ 52/311.1; 52/316; 52/235; 472/74

(58) Field of Classification Search
USPC ........ 52/235, 311.1, 311.2, 379, 506, 506.01, 52/316; 472/57, 72, 74, 75, 136
See application file for complete search history.

(56) References Cited

U.S. PATENT DOCUMENTS

| | | | | | |
|---|---|---|---|---|---|
| 349,471 | A | * | 9/1886 | Anderson | 52/392 |
| 652,516 | A | * | 6/1900 | Kotin | 472/63 |
| 783,831 | A | * | 2/1905 | Griffen | 472/74 |
| 1,591,722 | A | * | 7/1926 | Miller | 472/74 |
| 1,629,258 | A | * | 5/1927 | Conrad | 472/74 |
| 1,676,498 | A | * | 7/1928 | Lawrence | 52/38 |
| 2,579,943 | A | * | 12/1951 | Marchand | 52/312 |
| 3,778,945 | A | * | 12/1973 | Medow | 52/217 |
| 4,095,386 | A | * | 6/1978 | Johnson | 52/575 |
| 4,619,093 | A | * | 10/1986 | Gandillon | 52/311.2 |
| 4,622,796 | A | * | 11/1986 | Aziz et al. | 52/747.12 |
| 4,712,346 | A | * | 12/1987 | Luitjen | 52/747.12 |
| 4,791,740 | A | * | 12/1988 | Ferrari | 40/124 |
| 5,003,738 | A | * | 4/1991 | Hogeland | 52/202 |
| 5,123,211 | A | * | 6/1992 | Schlicht et al. | 52/202 |
| 5,333,428 | A | * | 8/1994 | Taylor et al. | 52/308 |
| 5,411,780 | A | * | 5/1995 | Kaefer | 428/38 |
| 5,465,539 | A | * | 11/1995 | Rose | 52/204.53 |

(Continued)

OTHER PUBLICATIONS

Houseplansandmore.com, House Plan #592-038D-0166 located at http://houseplansandmore.com/homeplans/home_plan_image_detail.aspx?ID=1; dated back to Jan. 14, 2010 by the Internet Archive Wayback Machine (last accessed on Feb. 1, 2013) at http://web.archive.org/web/20100114123210/http://houseplansandmore.com/homeplans/houseplan038D-0166.aspx.*

*Primary Examiner* — Robert Canfield
*Assistant Examiner* — Charissa Ahmad
(74) *Attorney, Agent, or Firm* — Roy L. Anderson; Wagner, Anderson & Bright, P.C.

(57) ABSTRACT

Structures with an outer wall structure have multiple angled walls that are alternately joined together so as to create recessed and protruding elements relative to a horizontal structural foundation, there being a façade structure added to the outer wall structure, so that a viewer at a predetermined viewing distance from the outer wall structure will see a reverse-perspective illusion on the outer wall structure when moving laterally relative to the outer wall structure. Reverse-perspective lines are formed by one or more visible elements that help to create a reverse-perspective illusion. Reverse-perspective lines, if extended to infinity, will converge at a vanishing point on a horizon line located at a preselected viewer's eye height at a predetermined distance from the structure but they are not parallel to the horizontal structural foundation.

20 Claims, 9 Drawing Sheets

(56) References Cited

U.S. PATENT DOCUMENTS

| | | | |
|---|---|---|---|
| 5,586,422 A * | 12/1996 | Hoffner | 52/529 |
| 5,786,044 A * | 7/1998 | Hauge | 428/8 |
| 5,937,587 A * | 8/1999 | Zinbarg | 52/3 |
| 6,131,345 A * | 10/2000 | Pelusio | 52/204.59 |
| 6,212,835 B1 * | 4/2001 | Schiedegger et al. | 52/211 |
| 6,279,280 B1 * | 8/2001 | Plager | 52/311.1 |
| 6,385,926 B1 * | 5/2002 | Kizar | 52/211 |
| 6,490,835 B1 * | 12/2002 | Simmons | 52/554 |
| 6,612,091 B1 * | 9/2003 | Glover et al. | 52/786.1 |
| 7,284,502 B1 * | 10/2007 | Dotter | 119/484 |
| 8,151,533 B2 * | 4/2012 | Krieger | 52/489.1 |
| 8,336,238 B1 * | 12/2012 | Hines | 40/610 |
| 2002/0066250 A1 * | 6/2002 | Plager | 52/311.1 |
| 2002/0166303 A1 * | 11/2002 | Crowley | 52/506.05 |
| 2004/0083667 A1 * | 5/2004 | Johnson, III | 52/379 |
| 2004/0187417 A1 * | 9/2004 | Thomas | 52/311.1 |
| 2005/0055921 A1 * | 3/2005 | Vella | 52/311.1 |
| 2009/0235600 A1 * | 9/2009 | Logan et al. | 52/314 |
| 2010/0314527 A1 * | 12/2010 | Fitzgerald et al. | 249/16 |
| 2011/0225917 A1 * | 9/2011 | Golden et al. | 52/316 |
| 2012/0137609 A1 * | 6/2012 | Loyd | 52/235 |

* cited by examiner

REVERSE-PERSPECTIVE ARCHITECTURE

CROSS-REFERENCE TO RELATED APPLICATIONS

This application is a continuation-in-part application of U.S. Ser. No. 13/231,947, filed Sep. 13, 2011, which itself is a continuation-in-part of U.S. Ser. No. 13/231,921, also filed Sep. 13, 2011, the disclosures of both of which are specifically incorporated herein by reference.

FIELD OF THE INVENTION

The field of the present invention is in structural buildings.

BACKGROUND OF THE INVENTION

Architects design many different structures and buildings, some of them relatively ordinary, some of them novel and eye catching to set them apart from the myriad of ordinary buildings. Thus, a demand exists for buildings and structures that are novel and eye catching to attract tenants and customers to the businesses in those buildings.

SUMMARY OF THE INVENTION

The present invention is generally directed to structures that have an outer wall structure with multiple angled walls that are alternately joined together so as to create recessed and protruding elements relative to a horizontal structural foundation, there being a façade structure added to the outer wall structure, so that a viewer at a predetermined viewing distance from the outer wall structure will see a reverse-perspective illusion on the outer wall structure when moving laterally relative to the outer wall structure.

The angled walls are preferably substantially planar and can also have a door and windows which conform to the reverse perspective. A reverse-perspective door can have a door that opens inwardly into the structure relative to a reverse-perspective door façade. Each reverse-perspective window can have an inner window and an outer reverse-perspective window façade; if an inner window has a rectangular shape, a view out of it, from inside of the structure looking out, will not have a rectangular shape because a portion of it will be blocked by the outer reverse-perspective window façade. When multiple reverse-perspective windows are included in a room they will be aligned so that they conform to the reverse-perspective line. Bottom reverse-perspective enhancements can be used to create multiple reverse-perspective lines that aid the reverse-perspective illusion.

Reverse-perspective lines of the present invention are formed by one or more visible elements that help to create a reverse-perspective illusion. Reverse-perspective lines, if extended to infinity, will converge at a vanishing point on a horizon line located at a preselected viewer's eye height but they are not parallel to the horizontal structural foundation.

The present invention can be used to create structures such as architectural buildings, model buildings and dollhouses.

Accordingly, it is primary object of the present invention to provide improved structures which use a reverse-depth perspective.

This and further objects and advantages will be apparent to those skilled in the art in connection with the drawings and the detailed description of the invention set forth below.

DETAILED DESCRIPTION OF THE PRESENT INVENTION

There are seven known depth cues, with stereopsis being the strongest, followed by motion parallax, and perspective (lines converging toward vanishing points), etc. The effectiveness of stereoscopic depth has an inverse relationship to viewing distance, i.e., as the viewer's distance increases, the stereoscopic depth cue reduces; however, motion parallax and the other depth cues do not diminish with distance.

In any normal 3D-rich scene, with multiple objects, as the viewer moves past the scene, these depth cues will be consistent to reinforce and confirm the depth of the scene and the physical relationship of objects (i.e., when the viewer moves to the left, the foreground objects appear to move to the right relative to the more distant objects).

Described here is a display technique which plays perceptual tricks on the mind by ignoring some of the traditional depth cues. The illusion of this invention uses reverse depth bas relief so that as a viewer moves past the structure, whereas the height and width of objects in the structure are as expected (close objects in the structure being larger than more distant objects); however, the close objects of the structure are recessed, and more distant objects are in relief. When the viewer moves past the structure, the structure appears to warp in a very attention getting way because the depth cues (the object size, and the motion parallax) are inconsistent.

This reverse-perspective illusion can be incorporated into the structural architecture of buildings, likely to be popular in theme parks, and as apartment and office buildings that are trying to attract renters. It can also be incorporated into structures such as architectural models and dollhouses.

In the Figures and the following description, letter designations indicate various features of the invention, with like letter designations referring to like features throughout both the drawings and the description. Although the Figures are described in greater detail below, the following is a glossary of the elements identified in the Figures.

| Glossary: | |
|---|---|
| BLDG | Building |
| BERM | Berm |
| CBL | Cable |
| CHDR | Chain Drive |
| CRBL | Concrete Block |
| DR | Door |
| EL | El train |
| EWW | East-West Wall |
| FACD | Façade |
| FCPL | Façade Plate |
| FCEX | Façade Extension |
| FKBR | Fake Brick |
| FOV | Field of View |
| IVY | Ivy |
| HL | Horizon Line |
| LRGP | Large Pulley |
| NSW | North-South Wall |
| RF | Roof |
| RPB | Reverse-Perspective Building |
| RPFR | Repositionable Pulley Frame |
| SCRL | Scored Lines |
| SFCM | Soft Cement |
| SMLP | Small Pulley |
| STEG | Straightedge |
| VP | Vanishing Point |
| VPE | Vanishing Point-East |
| VPN | Vanishing Point-North |
| VPS | Vanishing Point-South |
| VPW | Vanishing Point-West |
| VWR | Viewer |
| WALL | Wall |
| WF | Window Frame |
| WIN | Window |
| WM | Window Mask (also used for doors) |
| WMOL | Window Molding |

Figure 1:
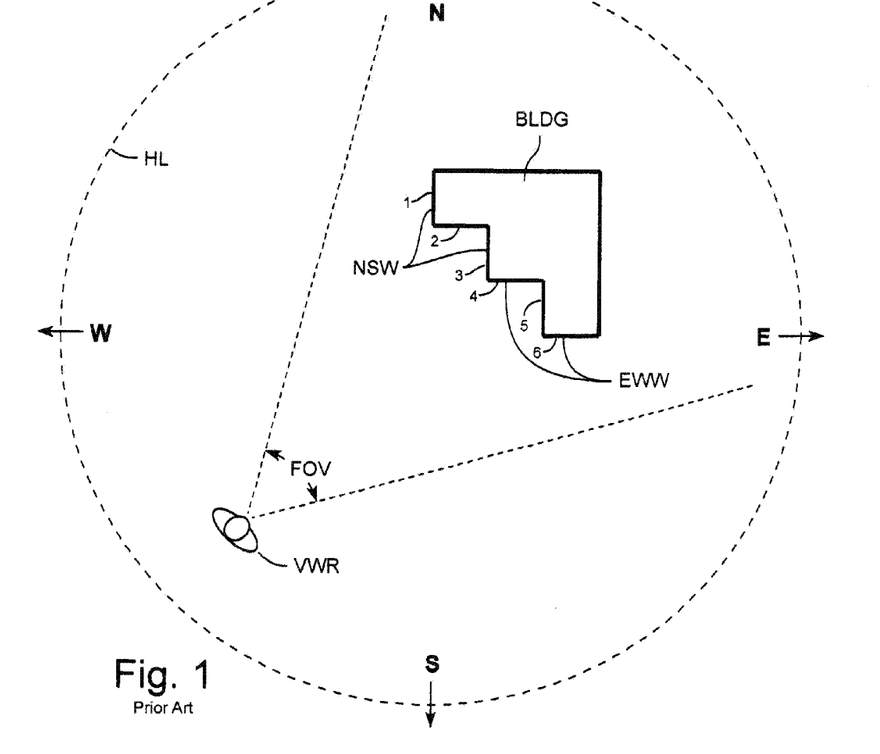
FIG. 1 is a prior-art top-plan view drawing of a conventional building, and reference horizon line.
Figure 13:
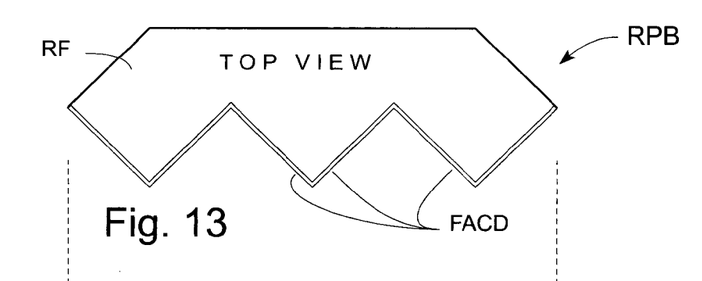
FIG. 13 is a top view of the building of FIG. 14.

Some buildings have been designed with repeating angular walls, that appear to be zigzag in top plan view, to provide better views and more corner offices, including the Trump Tower in New York City, and the Warner Brothers office in Los Angeles, as in FIGS. 1, 13.

For background, if a building were built on a lot, aligned north-south and east-west, FIG. 1, all horizontal lines on east-west walls, if extended to infinity, would appear to converge and vanish at vanishing points VP on the horizon line HL at the east and west. Similarly, all horizontal lines on the north-south walls, if extended to infinity, would appear to converge and vanish at vanishing points VP on the horizon line HL at the north and south.

The vanishing points are 90° apart, north, east, south and west, on the horizon line. When people look at a building from a corner of the building, getting the three-quarter view, because of the limited peripheral field of view, they usually can see building lines that appear to converge on just two adjacent vanishing points, for example, north and east, FIG. 1.

Figure 3:
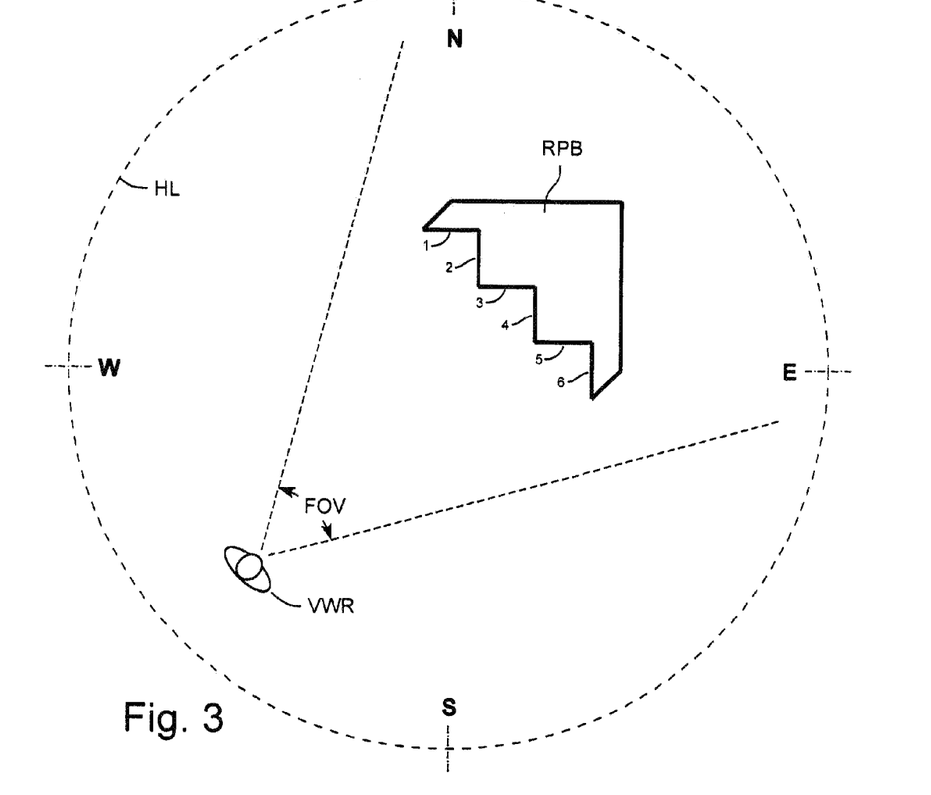
FIG. 3 is a top-plan view of a reverse-perspective building according to the present invention, and reference horizon line.

FIGS. 1 and 3 are conceptual top plan views. The large circles in FIGS. 1 and 3 represent an infinitely-large horizon line HL simply to indicate rotational direction and are not to scale with the building BLDG and RPB, of FIGS. 1 and 3, respectively, or of the viewer VWR. FIG. 1 is a prior-art for reference of a conventional building BLDG with all walls aligned north-south or east-west.

Figure 2:
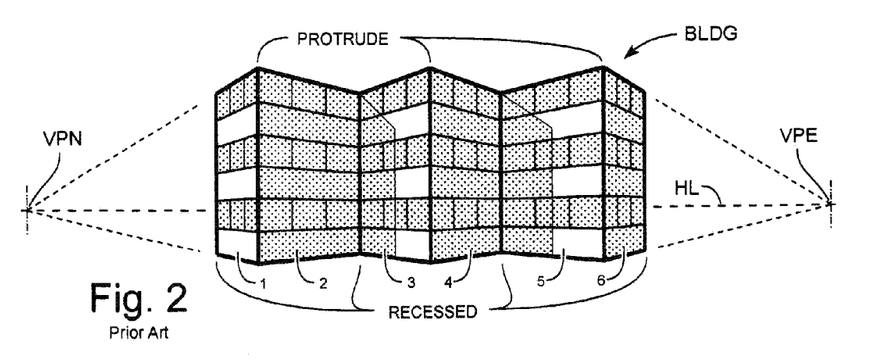
FIG. 2 is a perspective view of the building BLDG of FIG. 1 as seen by the viewer, VWR.

FIG. 2 is the view of the building BLDG seen by the viewer VWR who is getting a three-quarter view by looking toward the north-east direction.

FIG. 3 is the top plan view of the conceptual horizon line HL and of a reverse-perspective building RPB. The building is situated on the lot so that the visible front walls are aligned north-south or east-west.

Figure 4:
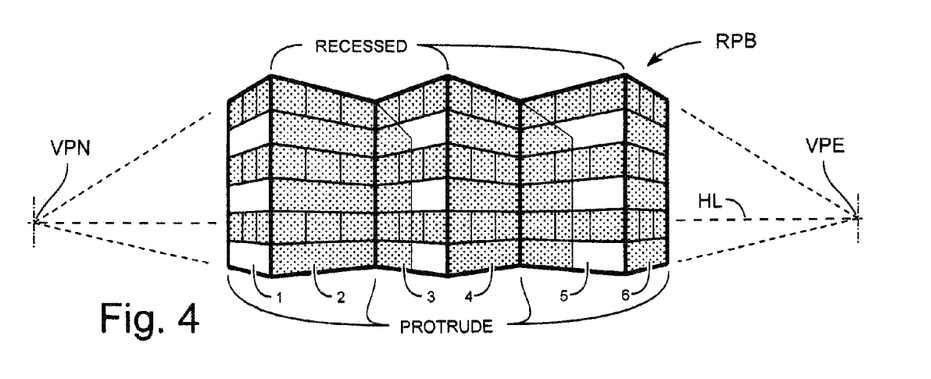
FIG. 4 is a perspective view of the reverse-perspective building RPB of FIG. 3 as seen by the viewer, VWR.

FIG. 4 is the view of the reverse-perspective building RPB as seen by the viewer, similarly getting a three quarter view by looking toward the north-east direct. Notice the views in FIGS. 2 and 4, of two very different buildings in FIGS. 1 and 3, are, identical other than in the Z-axis depth, or which parts protrude or are recessed. Thus, by looking at the labeled walls in FIGS. 1-4, in a side-by-side comparison of FIGS. 1 and 2 (prior art with 3 and 4 the resent the buildings appear nearly identical from a stationary position in front of the buildings, the buildings will be quite different because what appears to be the closest portion of these corners is not the same. In this regard the corner between walls 1&2, 3&4 and 5&6 in FIGS. 1 and 2 will actually be protruding whereas the corner between walls 1&2, 3&4 and 5&6 in FIGS. 3 and 4 will actually be recessed. The shades and shadows in FIG. 4 however are artificially created, with paint or choice of building materials, to give the effect of the real shades and shadows of FIG. 2 to reinforce the reverse-depth.

Viewed from a distance, where stereopsis is less effective at revealing depth, the passing observer initially will see what appears to be an ordinary building; however, if viewed while moving laterally, the passing observer will see the shapes of the building warp and change in very unexpected and attention-getting ways. In a theme-park setting, this will add to the fun of the experience.

Figure 5:
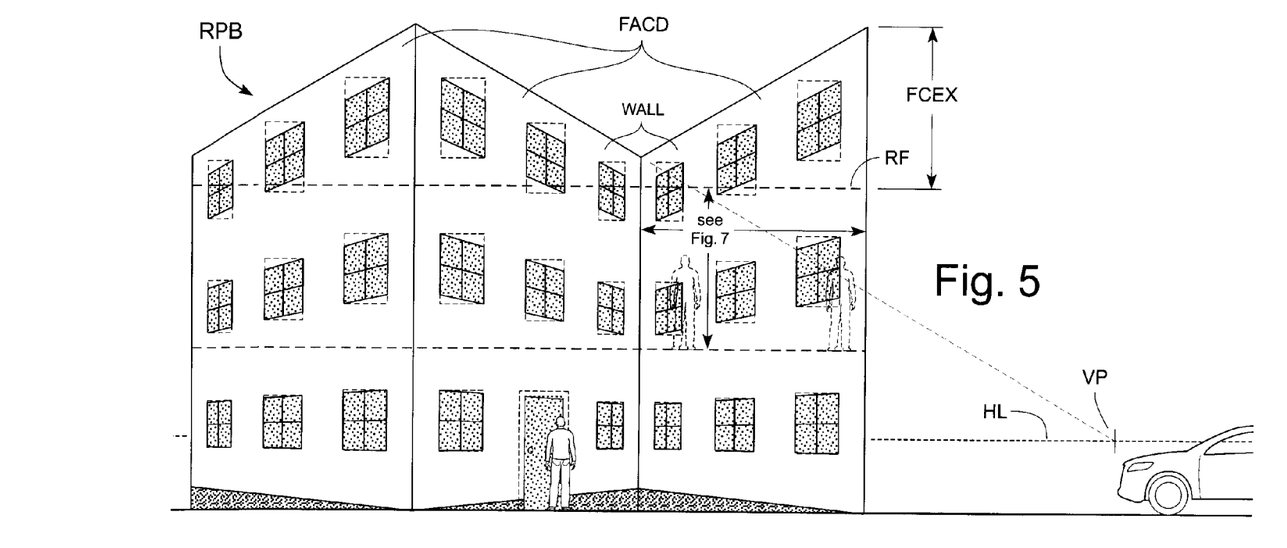
FIG. 5 illustrates a structural building according to the present invention that incorporates reverse-perspective architecture.
Figure 6:
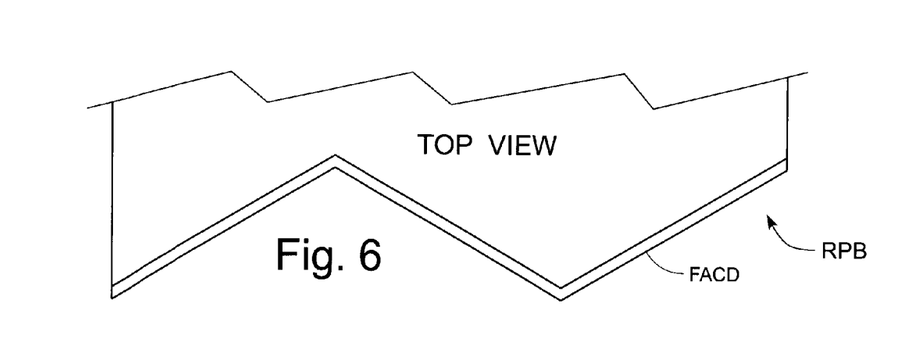
FIG. 6 is a top view of the building shown in FIG. 5.

FIG. 5 shows the basic use of reverse perspective in a simple 2-story building. The structural part of the building is conventional with horizontal floors and vertical walls. The front wall is segmented and angled to alternately create protruding and recessed vertical edges.

The front wall is extended at the top, FCEX, to create top edges which are radial to the vanishing points at right (shown) and left (not shown).

These reverse-perspective buildings are constructed conventionally, in large part, however, with a façade FACD applied to the front which becomes art and must comply with the rules of reverse perspective, including that "horizontal" lines (lines that would normally be horizontal on a conventional building, like the mortar joints between rows of bricks, and the tops and bottoms of doors and windows, and the roofline) converge at vanishing points VP on horizon line HL.

For reference, the horizon line is inherently at the height of the viewer's eyes. If someone rode up in a glass elevator, on the outside of a building, whereas the foreground objects (cars, other buildings, etc.) would appear to drop, but the position of the horizon line remains fixed, horizontal to the viewer. Therefore, it is important that the façade on these reverse-perspective buildings be laid out using vanishing points on the horizon line at the height of the typical viewer of the building which can be defined as a preselected viewer's height. This height can be different in different settings, shown in FIG. 5 as being at the height of the eyes of car drivers, and in FIG. 14 at the height of the eyes of the riders of the EL train.

Figure 7:
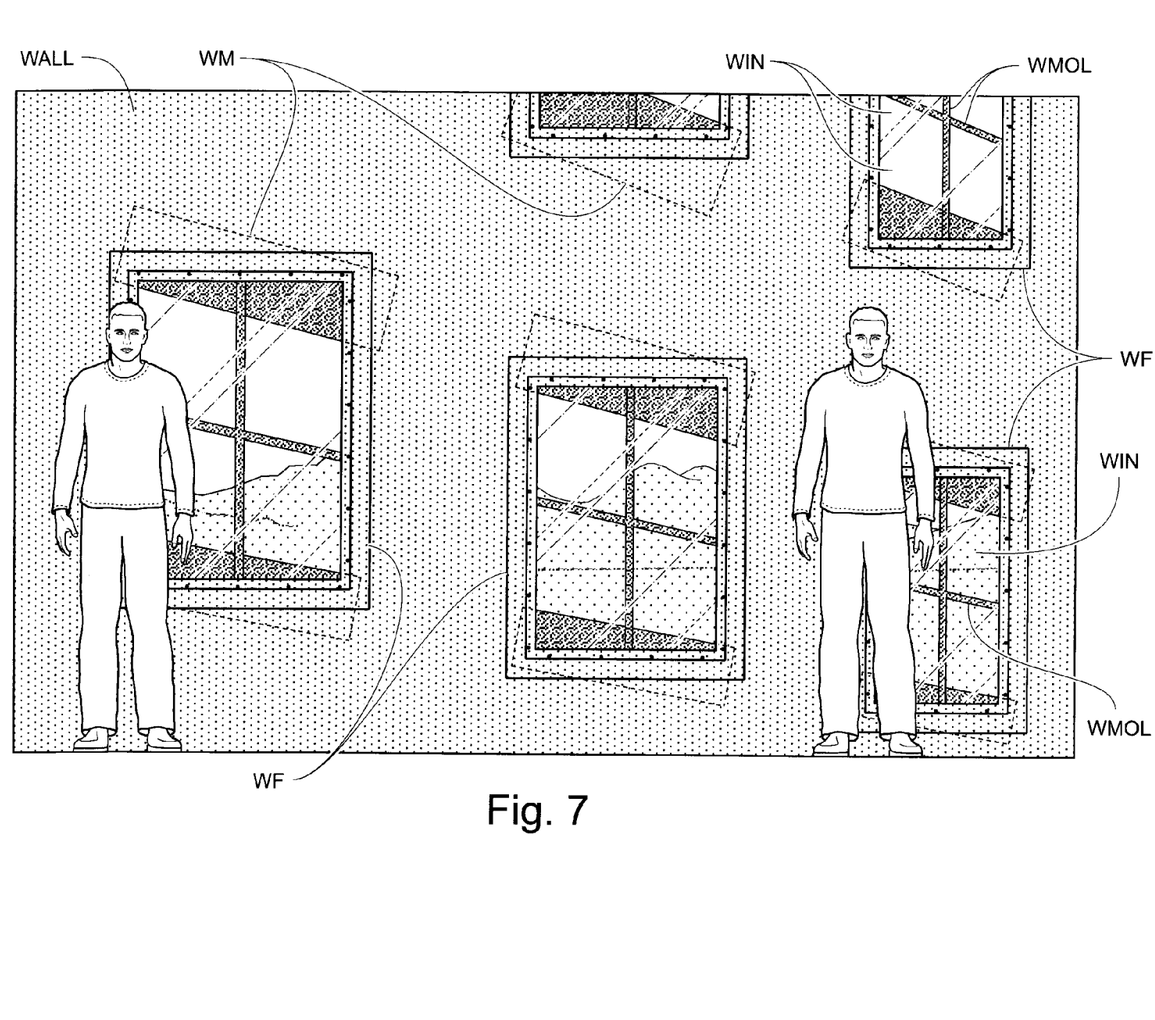
FIG. 7 illustrates an interior view of a second-floor room, from FIG. 5.

FIG. 7 is an interior view of a second-floor room, from FIG. 5, showing the view through the irregular quadrilateral windows WIN (of vertical sides, and angled top and bottom), and the rectangular window frames WF which are slightly taller than the outside window openings. The actual window frames are slightly oversize but rectangular and conventional to minimize the cost of construction. Glass is installed in the frames from inside of the reverse-perspective building, RPB.

The irregularly shaped doors DR and windows WIN are part of a façade, FACD. The conventional rectangular doors and windows are just behind the façade on the structural wall. The top of the door frame must appear to conform to the reverse perspective, and therefore be angled. To avoid having an irregularly-shaped swinging door, the rectangular door is slightly oversize and opens inward. Only the top edge of the door opening in the façade is angled. The physical swinging door is slightly taller than normal so that its horizontal top edge is masked by the angled top edge of the door opening in the façade. The real world meets the illusory world in that windows, that are shaped to conform to the perspective, are at varying but usable heights for the occupants, FIGS. 5, 7. This dichotomy of real-vs.-illusion is an everyday tradeoff in theme park design where the priority is on the illusion.

Figure 8:
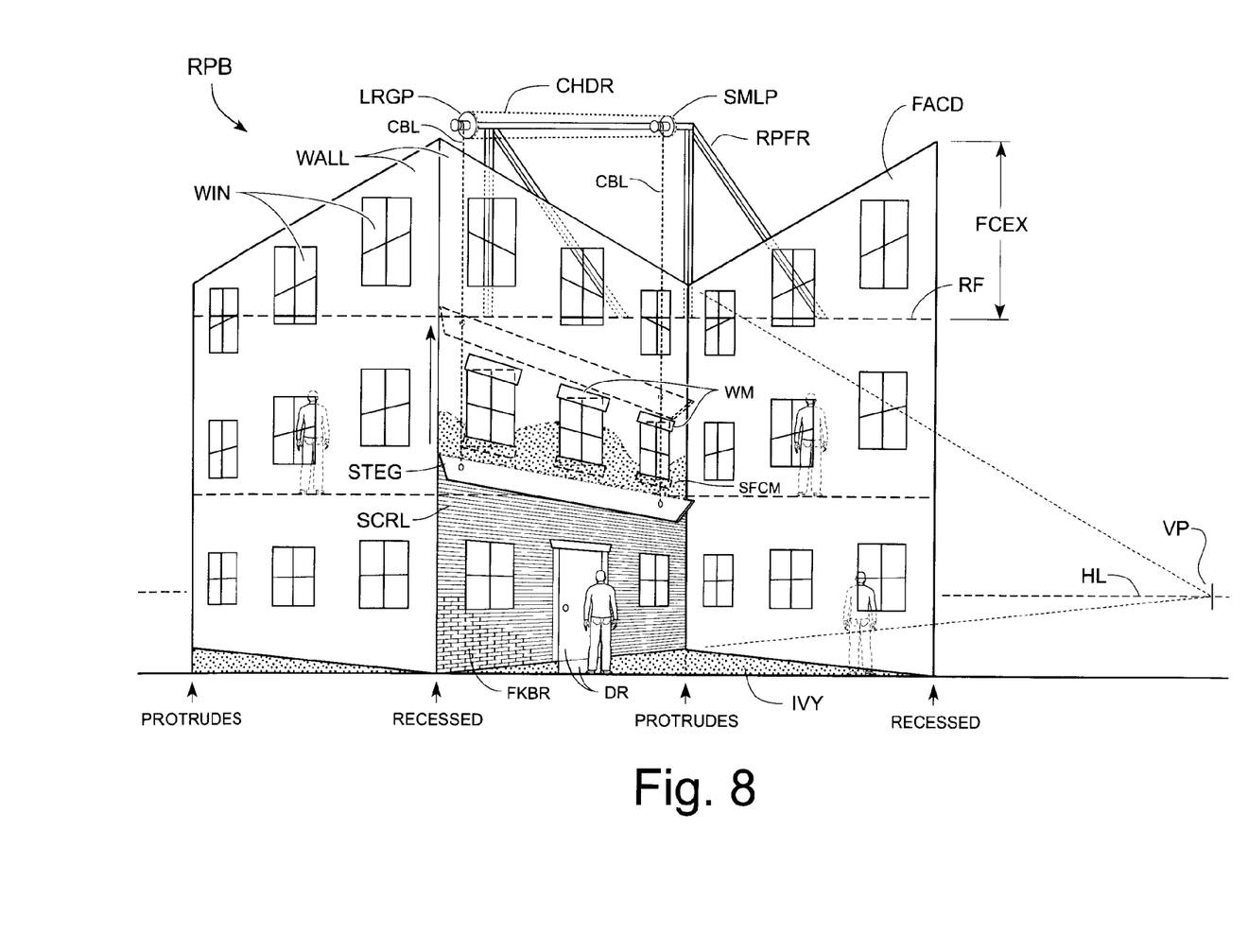
FIG. 8 illustrates a reverse-perspective building under construction that incorporates a fake-brick look.
Figure 9:
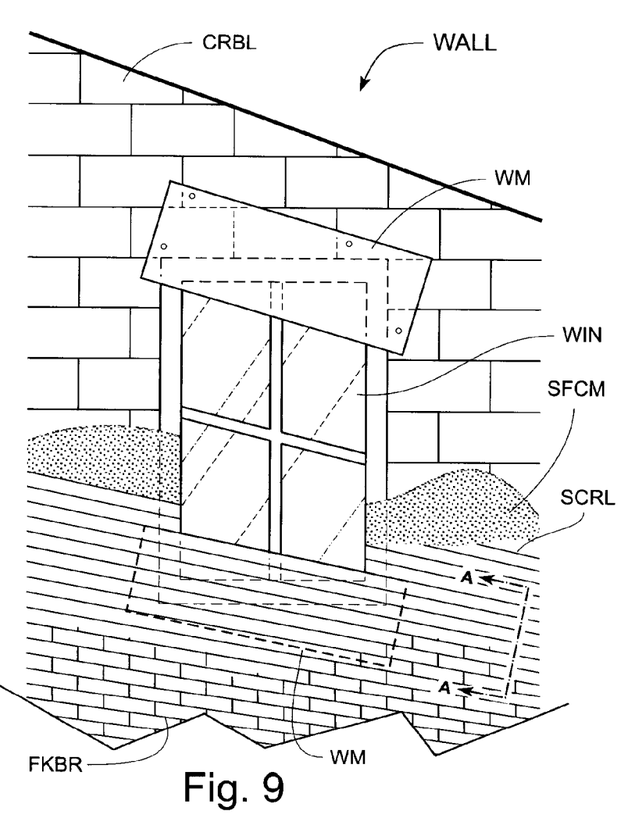
FIG. 9 illustrates an exterior view of a wall of concrete block in a building such as is illustrated in FIG. 5 under construction.
Figure 10:
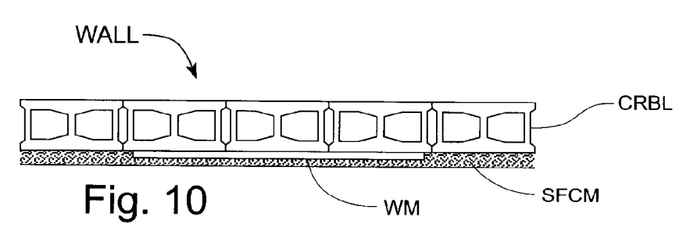
FIG. 10 is a top view of the concrete-block wall.
Figure 11:
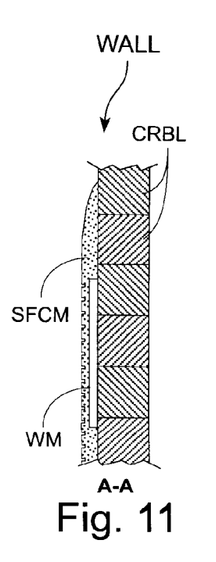
FIG. 11 is a vertical section through the wall.
Figure 12:
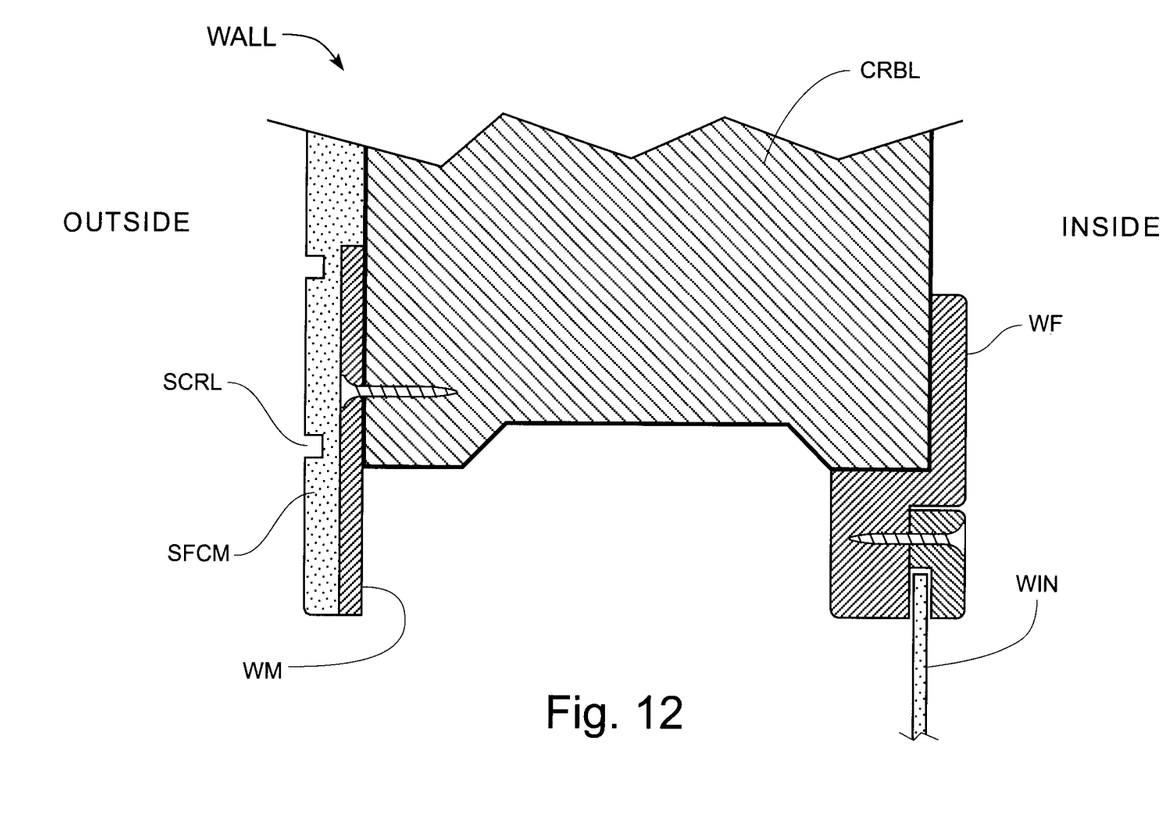
FIG. 12 is an enlarged section through the wall with scored fake-brick lines.

If a reverse-perspective building is to appear to be made of brick, FIG. 8, construction would typically start with a conventional concrete-block wall WALL surfaced with a smooth layer of cement SFCM which becomes the façade FACD. Window masks WM, FIGS. 8-12, are attached to a concrete-block wall WALL, which are covered with a smooth layer of cement, FIGS. 8-10, 12. While the cement SFCM is still workable, score lines SCRL are scored, FIGS. 8, 9, 12, radial to the vanishing point VP, FIGS. 4, 5, 8, 14, and with staggered vertical lines, for a fake-brick look FKBR, FIGS. 8, 9. FIG. 9 is an orthographic front view of the wall WALL, the top of which has been cut off at an angle radial to the vanishing point VP, FIGS. 4, 5, 8, 14. Consistent with this, other lines, that would be horizontal in a conventional building, like the top and bottom edges of the window, the molding separating the rows of window panes, and the lines separating the brick rows, are also radial to the vanishing point VP, FIGS. 4, 5, 8, 14.

The lines between brick rows are radial to the vanishing point VP, and therefore each is at a slightly different angle. One way to get the varying angle is to lower a straightedge STEG, FIG. 8, hanging by two cables CBL from two linked pulleys of slightly different diameters, LRGP and SMLP, so that one end raises and lowers at a slightly different rate than the other. Then the straightedge is held against the soft cement SFCM and used as a reference for the worker to score the concrete, FIG. 12, between the rows of "brick". When the concrete is dry, the outer surface can be painted with a relatively dry paint roller leaving the scored grooves in the concrete the typical mortar color.

Using pulleys of two diameters changes the angle of the straightedge STEG; however, this only approximates pivoting about a virtual vanishing point VP. The straightedge can be made to move accurately about a fixed vanishing point VP, at any convergence distance and on either side, left or right, by computer controlling the relative rotation of two pulleys. This allows the construction crew to shift the repositionable pulley frame RPFR, FIG. 8, on the roof, behind the façade extension FCEX to each flat face of the façade, FACD, without having to swap pulleys LRGP and SMLP to flip the vanishing point VP to the other side.

Figure 14:
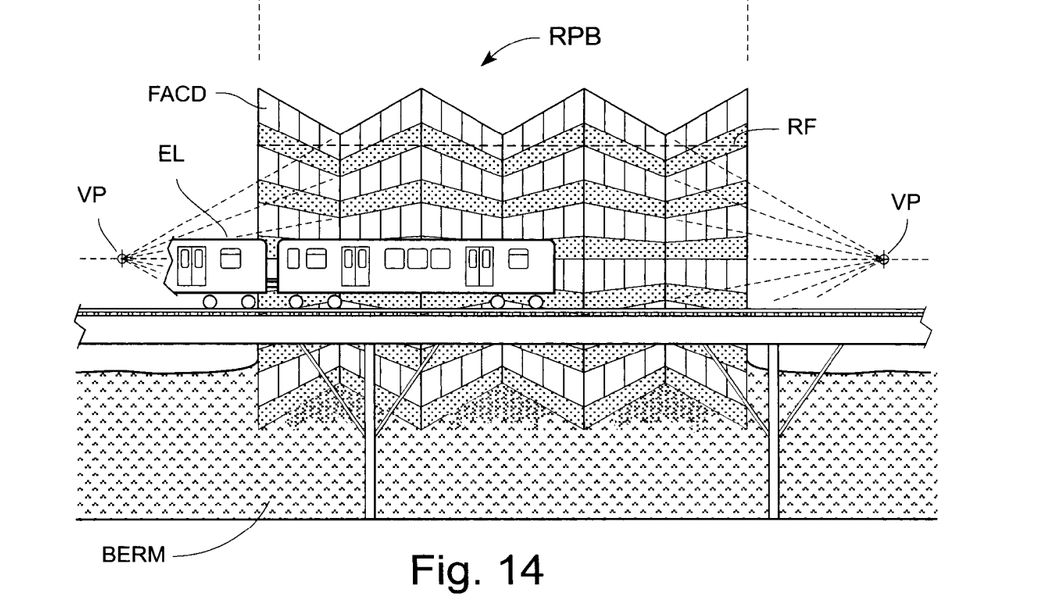
FIG. 14 is a front view that illustrates a multi-story building incorporating reverse-perspective created for the viewers of a passing elevated train.
Figure 15:
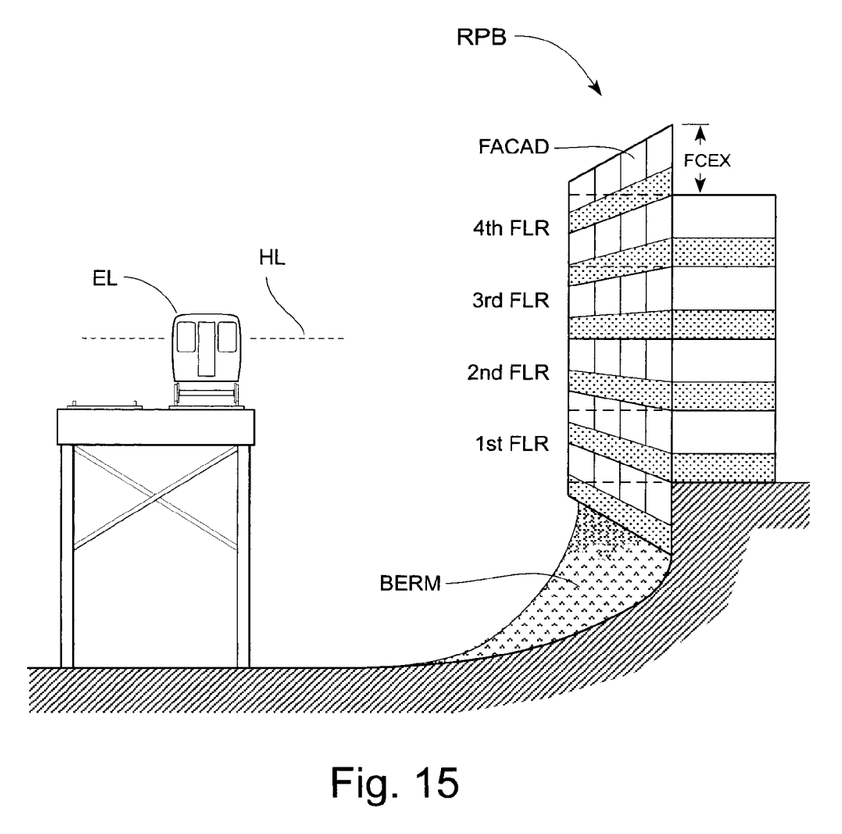
FIG. 15 is a side view illustration of the multi-story building of FIG. 14, showing the lengthwise view of the elevated train.

Another example of reverse perspective in architecture could be where the viewers are not at ground level, for example commuters in an elevated train EL as in Chicago, FIGS. 13-15. As with other reverse-perspective art, the vanishing points VP are at the height of the viewers' eyes, in this case, the eyes of the viewers in the elevated train EL.

Everything possible should be done to "sell" the reverse-perspective illusion which can include using reverse-perspective enhancements means at the visible bottom of the structure, such as planting small-leaf Hahn's ivy on a sculpted berm at the protruding vertical edges of the building, and large-leaf Thorndale ivy near the recessed vertical edges. False shadows SHDW can be created with paint, or by using darker stone, not shown. If the exterior walls are glass, artificial reflections, not shown, can be added by using different colors of glass.

A structure according to the present invention uses repeating angular walls, but with the addition of multiple reverse-perspective lines that create a reverse-perspective illusion. The reverse-perspective lines are created by creative use of lines that can be formed structurally or through graphics or by using a façade structure so as to create reverse-perspective windows and doors, as already described. A façade structure added to the top of the outer wall structure, coupled with any bottom reverse-perspective enhancements, complete the reverse-perspective illusion which relies upon reverse-perspective lines that, if extended to infinity, will converge at a preselected viewer's eye height at a predetermined distance from the structure, but they are not parallel to the horizontal structural foundation.

Although the foregoing detailed description is illustrative of preferred embodiments of the present invention, it is to be understood that additional embodiments thereof will be obvious to those skilled in the art. Further modifications are also possible in alternative embodiments without departing from the inventive concept.

Accordingly, it will be readily apparent to those skilled in the art that still further changes and modifications in the actual concepts described herein can readily be made without departing from the spirit and scope of the disclosed inventions as defined by the following claims.

What is claimed is:

1. A structural building, comprising:
an outer wall structure comprised of at least three angled walls that are alternately joined together so as to create a recessed element between a pair of adjacent walls of the three or more angled walls and a protruding element between a second pair of adjacent walls of the three or more angled walls relative to a horizontal structural foundation, the first pair and the second pair each sharing one common wall and each having a non-shared wall; and
a façade structure added to the outer wall structure which creates a reverse perspective illusion for a viewer located outside of the structure at a predetermined viewing distance away from the outer wall structure;
wherein the reverse perspective illusion uses a reverse bas depth so that as the viewer moves past the structure a height and a width of a plurality of objects in the structure appear such that a closer object to the viewer more distant object even though the closer object is recessed and the more distant object in relief relative to the viewer.

2. The structure of claim 1 wherein each of the at least three angled walls is substantially planar.

3. The structure of claim 1 wherein the outer wall structure contains multiple reverse-perspective lines created by the façade structure that, if extended to infinity, would converge at a vanishing point on a horizon line located at a preselected viewer's eye height at the predetermined viewing distance but the multiple reverse-perspective lines are not parallel to the horizontal structural foundation.

4. The structure of claim 3 wherein at least one of the multiple reverse-perspective lines is created in a building material used to construct at least one of the multiple angled walls.

5. The structure of claim 3 where at least one of the multiple reverse-perspective lines is comprised of a graphic line that is not a structurally functional line.

6. The structure of claim 1 wherein the façade structure creates multiple reverse-perspective lines that, if extended to infinity, would converge at a vanishing point on a horizon line located at a preselected viewer's eye height at the predetermined viewing distance but the multiple reverse-perspective lines are not parallel to the horizontal structural foundation.

7. The structure of claim 1 wherein the structure contains a reverse-perspective door comprised of a door formed in the outer wall structure and a reverse-perspective door façade formed in the façade structure.

8. The structure of claim 7 wherein the reverse-perspective door façade contains at least one reverse-perspective line that, if extended to infinity, would converge at a vanishing point on a horizon line located at a preselected viewers eye height at the predetermined viewing distance but the at least one reverse-perspective line is not parallel to the horizontal structural foundation.

9. The structure of claim 7 wherein the door opens inwardly into the structure.

10. The structure of claim 1 wherein the structure contains a plurality of reverse-perspective windows.

11. The structure of claim 10 wherein each of the plurality of reverse-perspective windows is comprised of an inner window and an outer reverse-perspective window façade.

12. The structure of claim 11 wherein the outer reverse-perspective window façade creates at least one reverse-perspective line that, if extended to infinity, would converge at a vanishing point on a horizon line located at a preselected viewer's eye height at the predetermined viewing distance but the at least one reverse perspective line is not parallel to the horizontal structural foundation.

13. The structure of claim 11 wherein the inner window of a first reverse-perspective window of the plurality of reverse-perspective windows has a rectangular shape.

14. The structure of claim 13 wherein a view out of the first reverse-perspective window, from inside of the structure looking out, will not have a rectangular shape because a portion of the inner window will be blocked by the outer reverse-perspective window façade.

15. The structure of claim 1 wherein the structure has a room with a plurality of reverse-perspective windows that look outward from the structure, said plurality of reverse-perspective windows being aligned so that they create at least one reverse-perspective line that, if extended to infinity, would converge at a vanishing point on a horizon line located at a preselected viewer's eye height at the predetermined distance from the structure but the reverse perspective line is not parallel to the horizontal structural foundation, said at least one reverse-perspective line being created by a linear edge of the plurality of reverse-perspective windows visible at the preselected viewer's eye height at the predetermined distance.

16. The structure of claim 1 wherein the structure is an architectural building.

17. The structure of claim 1 wherein the structure is a model building.

18. The structure of claim 1 wherein the structure is a doll house.

19. The structure of claim 1 further comprising a bottom reverse-perspective enhancement means for creating multiple reverse perspective lines that, if extended to infinity, would converge at a vanishing point on a horizon line located at a preselected viewer's eye height at the predetermined distance but the multiple reverse-perspective lines are not parallel to the horizontal structural foundation.

20. A method of creating a reverse-perspective structural building, comprising:
  constructing an outer wall structure comprised of at least three angled walls that are alternately joined together so as to create a recessed element between a pair of adjacent walls of the three or more angled walls and a protruding element between, a second pair of adjacent walls of the three or more angled walls relative to a horizontal structural foundation the first pair and the second pair each sharing one common wall and each having a non-shared wall; and
  constructing a façade structure added to the outer wall structure having a width, a height and a depth, the depth being reversed so that a first part of the façade structure that appears to protrude is actually recessed and a second part of the façade structure that appears to be recessed is protruding, which creates a reverse perspective illusion for a viewer located outside of the structural building at a predetermined viewing distance away from the outer wall structure.

* * * * *